Aug. 9, 1966          B. W. ROBINS          3,266,041
AIRCRAFT SINGLE RADIO NAVIGATION SYSTEMS FOR MULTI-STATION USE
Filed Sept. 18, 1963                    3 Sheets-Sheet 1

INVENTOR.
BEN WHITE ROBINS
BY
Kimmel & Crowell
ATTORNEYS.

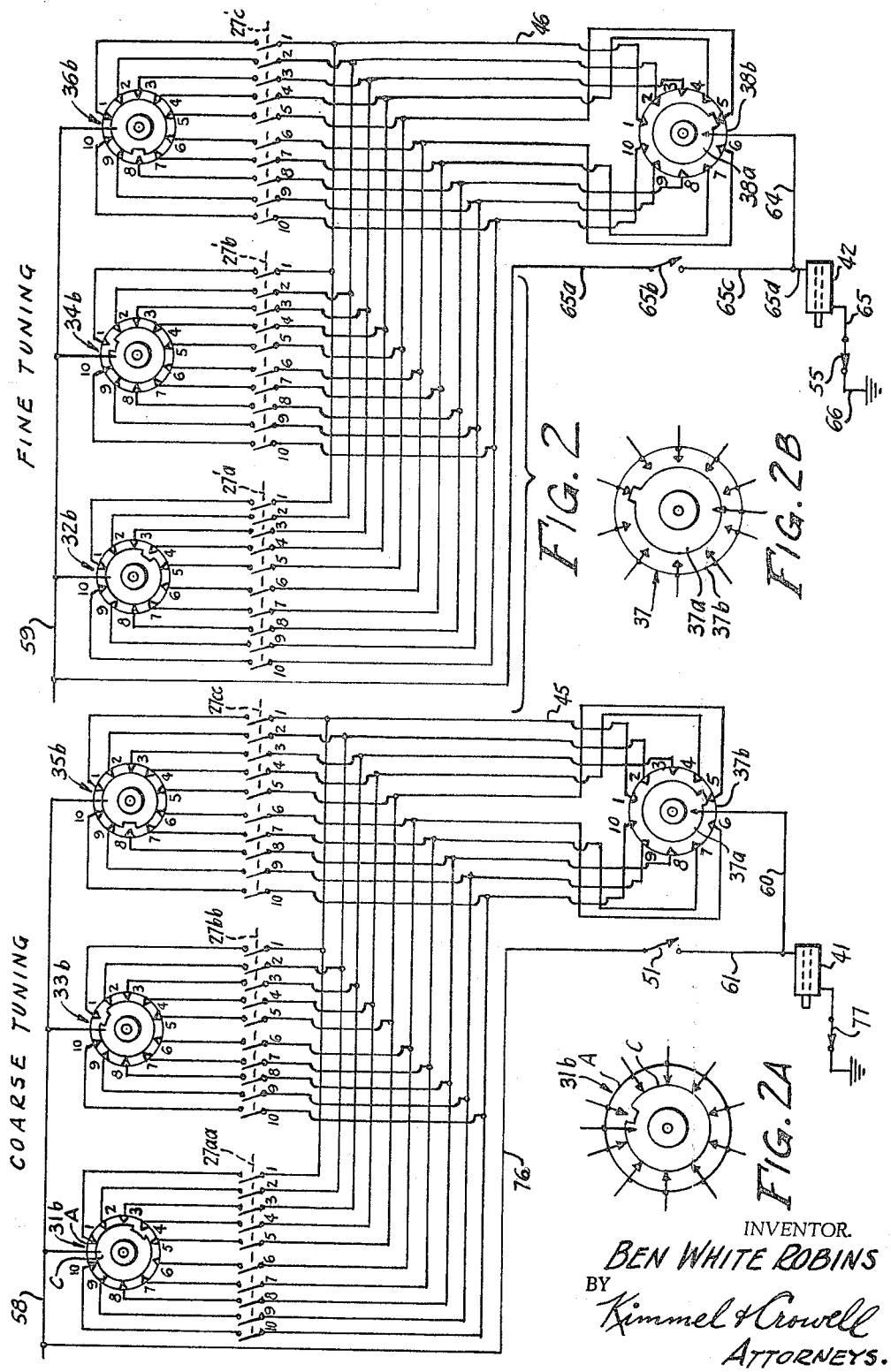

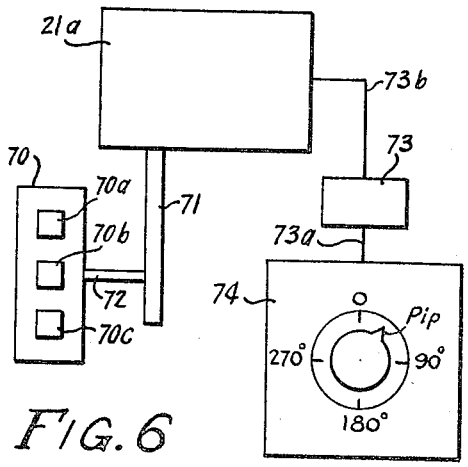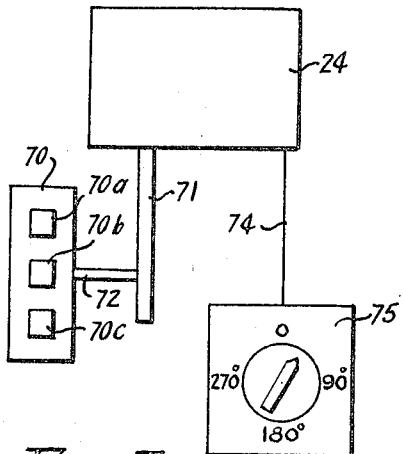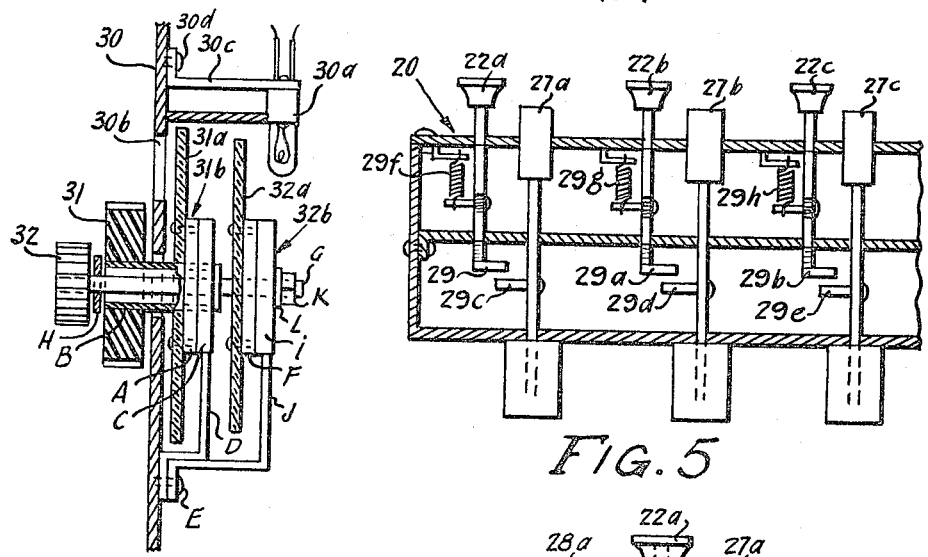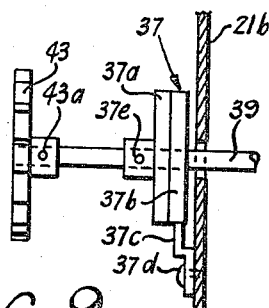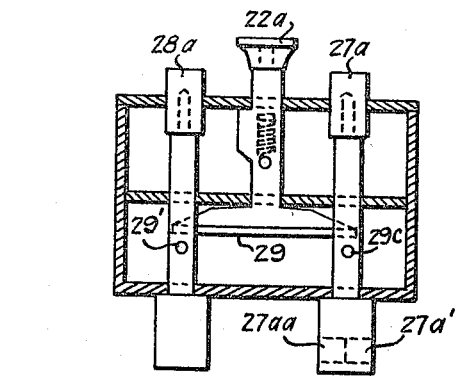

United States Patent Office 3,266,041
Patented August 9, 1966

3,266,041
AIRCRAFT SINGLE RADIO NAVIGATION SYSTEMS FOR MULTI-STATION USE
Ben White Robins, 2404½ Metts Ave., Wilmington, N.C.
Filed Sept. 18, 1963, Ser. No. 309,735
13 Claims. (Cl. 343—112)

This invention relates to aircraft radio navigation equipment, and in particular, to systems which provide for rapidly returning to any desired one of several pre-set combinations of equipment adjustments, thus enabling the rapid and at-will choice among several ground transmitting stations without the requirement of more than a single radio receiver and display unit. One embodiment involves a combination comprising a single VOR radio receiver, a single converter with a course selector and indicator and a control means for rapidly and selectively changing the tuning of the radio receiver and the setting of the course selector, both in synchronism as a unit, from one ground radio station to another selected ground station, in one command mode of operation, during flight to maintain accurately a course of navigation and knowledge of aircraft position.

Radio signals from ground stations are often used for the navigation of aircraft. For example, it is customary to use visual omnirange (VOR) stations and employ a radio receiver and a converter-indicator to appropriately receive, identify, process and display the information transmitted by the VOR ground station. It is often desirable to selectively acquire and utilize the information from more than one VOR ground station, more or less simultaneously. However, proper tuning of the receiver and adjustment of the course selector of the converter-indicator require considerable time and attention when the pilot may by necessity be busy operating other controls of the aircraft. Such attention to the individual tuning in detail of the various components of such equipment makes it impracticable to rapidly shift the tuning of this equipment back and forth between even as few as two VOR ground stations. It is to be noted that returning to a previously used station is as laborious and time-consuming as tuning in a new station. Many aircarft carry two complete and independent VOR receiving systems. Such installations are usually known as dual-omni systems, occupy twice as much space as a single receiving system, are heavy and costly, and often are not capable of solving the above navigation problems as solved by my new operational combination of aircraft equipment components when used as a navigational system, where space, weight and electric power are at a premium and consideration of the costs of such equipment is an important factor.

I have solved the above control problems with a minimum of components of conventional aircraft equipment which represents a substantial saving in cost and equipment space, by providing a unique combination of equipments operably inter-connected by a new unitary control means which will permit multiple command control of the equipment from one ground station to another ground station in the form of one command mode of operation implemented by a simplified common linkage control means. The embodiments of the invention provide a new method of simultaneously controlling the various components of the combination which permits accurate and responsive control of these components simultaneously and selectively between a plurality of ground stations, as desired. An exemplary embodiment of my invention permits by one command mode of operation the simultaneous switching of the various components of the navigation system where the radio receiver means may be mounted at a remote position in the aeroplane from the cockpit. The new operational combination of the switching means for this embodiment of the invention comprises in general, a common switch linkage means in the cockpit providing a multiple command control means which simultaneously adjusts the radio receiver tuning with the course selector setting for a desired station. The tuning of the receiver is accomplished by simultaneously operating a coarse tuning shaft and a fine tuning shaft of a crystal controlled received by simultaneously closing two circuit means, each being energized by a suitable electrical energy means, solenoid means, micro-switch means and 10 contact rotary switch means mounted on the tuning shaft of the remotely positioned receiver. Ten position cog wheels having saw-toothed cog means are mounted on each of the two tuning shafts of the receiver. The cog wheel on each tuning shaft is actuated by the solenoid means through energized circuit means as will be later explained in detail. In the design of the apparatus, provision may be made for handling two, three, four or more ground stations. For illustration, a three-station system will be described, and it should be understood that the invention is not necessarily limited thereby. The switch means consists of three switch and dial assemblies for both coarse and fine tuning of the crystal controlled receiver for the three preset tuning positions of each shaft as shown. Each switch and dial assembly consists of two switch components with concentric shafts in which each shaft is fixed to its respective dial means. Each switch is a rotary 10 contact, 10 position switch of commerical manufacture, in which all points except one make contact. The three exemplary switch and dial assemblies as shown in the cockpit for the remotely positioned receiver permit selective and rapid tuning between three ground stations by selectively operating the appropriate push button on the unitary control means in the cockpit.

The theory of operation of the various commercial components of the new operational combination is well known to those skilled in the art.

A second embodiment of my inventive system of navigation consists generally of a continuously tuned radio receiver, converter, flight path deviation indicator, course selector and common adjustable push button control linkage means between said radio receiver and said course selector for a plurality of radio ground stations and azimuth course settings on the course selector.

A third embodiment of my inventive system of aircraft navigation, in combination, consists generally of a continuously tuned radio receiver, converter means, cathode ray tube flight path indicator means and conventional mechanical push button tuning means operatively connected to the above radio receiver for selectively tuning the radio receiver to a plurality of ground radio transmitting stations.

A fourth embodiment of my inventive aircraft navigational system, comprises the operational combination of a continuously tuned radio receiver, mechanical push button tuning means for said receiver, and an automatic direction finding indicator means (meter or the like) operatively connected to the output signal of said radio receiver means.

Therefore, it is a primary object of this invention to provide a unitary control device which is complementary to all adjustable components of the receiver and course selector, in cooperation with the converter and indicator combination.

Another object of this invention is to provide the capability of rapidly and selectively accepting signals from several ground stations to determine aircraft position for navigation purposes without the need of more than one VOR receiver and one converter-indicator.

Another object of the invention is to provide for the handling of an instrument landing system (ILS) localizer signal in lieu of one of the VOR ground station signals previously mentioned.

A further object of the invention is to provide a unitary control means for rapidly and selectively accepting signals from several ground stations in a system which utilizes a single VOR receiver having continuous tuning in combination with a converter and cathode-ray tube indicator.

A still further object of the invention is to provide for the rapid and at-will selection among several ground transmitters whose signals are used to excite an automatic direction finding (ADF) receiving signal system.

Another object of my invention is to facilitate placement of the navigation receiver in areas which may be inaccessible during flight, thus, conserving cockpit space, which is often critical.

With these and other objects in view, the invention includes certain novel features hereinafter described with reference to the drawings which accompany and form a part of this specification.

In the drawings:

FIGURE 1 is a view of the cockpit controls of the exemplary embodiment of my invention for a crystal tuned VOR/ILS receiver which may be remotely located, as desired FIGURE 2 is a circuit diagram interconnecting the tuning means in the cockpit with the selectively positioned switch assemblies on each of the tuning shafts of the crystal controlled receiver as operated by solenoid means when selectively energized by the battery or other desired electrical energy means through the switching means in the cockpit;

FIGURE 2A is a detail view of the 10 position switch contacts of each switch mounted on each of the pairs of preset tuning dials in the cockpit of FIGURES 1, 2 and 3;

FIGURE 2B is a detail view of the 10 position switch contacts of each switch mounted on the two tuning shafts of the crystal tuned receiver of FIGURES 1, 2 and 3;

Figure 1:
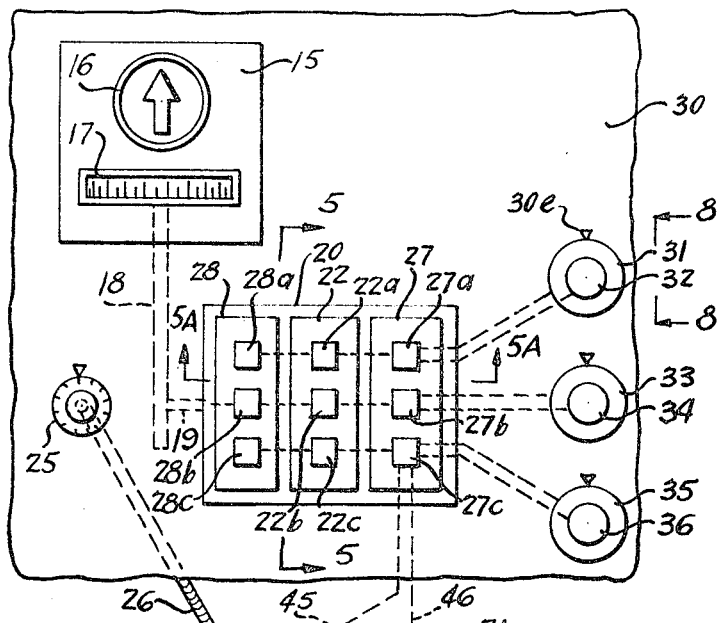
Figure 3:
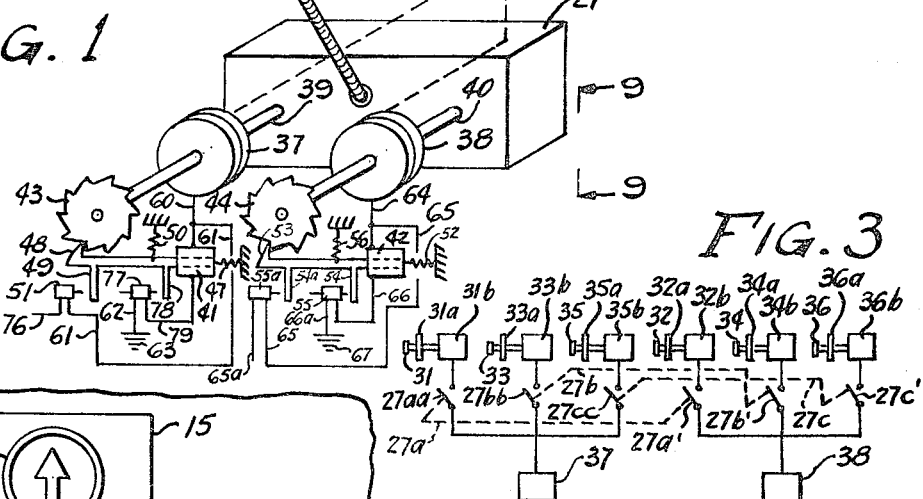
Figure 4:
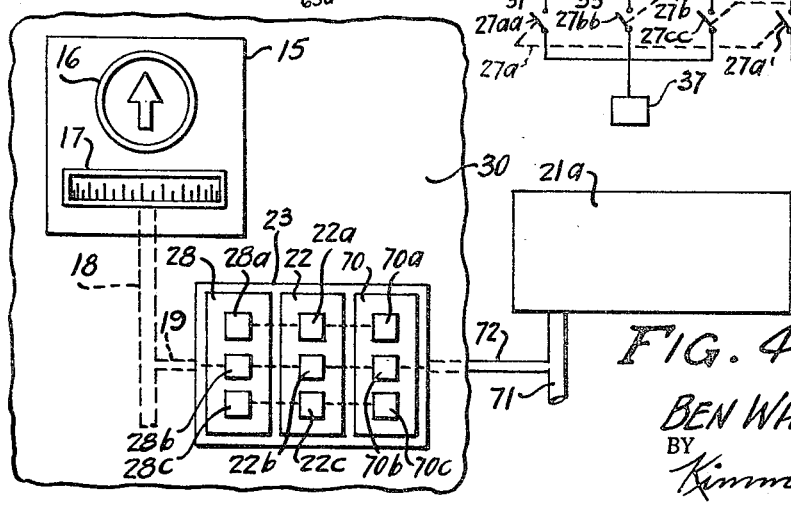

FIGURE 3 is a single line diagram showing the pairs of ganged switches operated by each electrical push button of FIGURE 1 for the crystal controlled receiver as connected between the 10 contact switch means of the solenoid actuated tuning shaft of the receiver and the three corresponding 10 contact switches and three corresponding preset tuning dials (for three stations) for both the fine tuning shaft and coarse tuning shafts of the receiver of FIGURE 1;

FIGURE 4 is another exemplary embodiment of my invention in which a continuously tunable VOR/ILS receiver and converter/indicator are selectively controlled by a push button means in the cockpit of an aircraft;

FIGURE 5 is a sectional view of the command tuning linkage means for operating two conventional push button tuning means of FIGURE 1 taken on lines 5—5 in the direction of the arrows;

FIGURE 5A is another sectional view of the command tuning linkage means for operating two conventional push button tuning means of FIGURE 1 taken on lines 5A—5A in the direction of the arrows;

FIGURE 6 shows the push button selective mechanism applied to a single VOR receiver having continuous tuning in combination with a converter and cathode-ray tube flight path indicator;

FIGURE 7 discloses another adaptation of the control means of my invention as applied to an automatic direction finding (ADF) receiving navigational system as utilized in the cockpit of an aircraft;

FIGURE 8 discloses a part sectional view in association with a pair of tuning shafts of the crystal controlled receiver having mounted thereon two 10 position contact rotary switches and two concentric dials taken on lines 8—8 of FIGURE 1 viewed in the direction of the arrows; and FIGURE 9 is a part sectional view of the front of the receiver and tuning shaft having mounted thereon a rotary 10 position contact switch and a 10 tooth ratchet sprocket wheel for coacting with a solenoid means taken on lines 9—9 of FIGURE 1 in the direction of the arrows.

Referring to the drawings in which like parts are represented by like reference numerals, FIGURES 1, 2, 2A, 2B, 3, 5, 5A, 8 and 9 disclose an exemplary embodiment of my invention as applied to a flight control panel of an aircraft in which a crystal controlled radio receiver is remotely positioned in the plane and tuned from the cockpit. The instrumentation of the control panel in the cockpit consists of a converter 15, flight path deviation indicator 16, course selector 17, all of commercial manufacture, including control shaft 18, shown in dotted lines for selector 17, which is connected by mechanical linkage 19 to a conventional mechanical push button selector control means 28 to control assembly means 20 for selector 17 and radio receiver 21. Assembly means 20 consists of three or more push button station selectors. The command station selectors are shown as squares 22a, 22b and 22c. For complete control of the radio receiver of this embodiment of the invention, volume control 25 is provided on the cockpit control panel which is connected by flexible linkage means 26 to the volume control 25 of receiver 21 of FIGURE 1, or alternatively, the volume control means may be removed from the receiver, and mounted in the cockpit with shielded connections to the receiver. Flexible linkage means 26 may be of a speedometer type of flexible drive shaft as used in automobiles or other linkage means as desired.

For purposes of clarity the output signal cable from radio receiver 21 to the converter 15 has not been shown, as such practice is well known in the art.

The instrumentation of the control panel of FIGURES 1 and 5 for station selection by radio receiver 21 is accomplished by conventional electrical push button control means 27 being interconnected to the command tuning means 22 as illustrated in FIGURES 5 and 5A. The tuning button means 27a, 27b and 27c of electrical tuning means 27 of FIGURE 1 are symmetrical and oppositely disposed to the corresponding push button means 28a, 28b and 28c of the mechanical push button tuning assembly of the course selector 17. Between the two push button tuning assemblies 27 and 28 is interposed command push button assembly 22 having the command push buttons 22a, 22b and 22c, each having a common linkage means 29 for simultaneously actuating the respective tuning buttons on the two conventional push button tuning means as shown in FIGURE 5. As an example, command push button 22a simultaneously closes or releases tuning button means 27a and 28a; similarly, command push button 22b simultaneously operates push buttons 27b and 28b; and command button 22c similarly operates push button means 27c and 28c.

On the right side of cockpit panel 30 are three sets of tuning knobs, namely, 31 and 32, 33 and 34, and 35 and 36. Each set of knobs are for presetting into this embodiment of the invention the coarse and fine tuning of a desired ground station. In other words, the coarse and fine tuning of three desired ground stations may be preset into my inventive tuning system as illustrated for FIGURE 1. Although only three preselected ground stations are shown, additional stations may be added, if desired, by the adding of more pairs of knobs and corresponding push buttons on the cockpit panel 30. Each tuning knob is attached by concentric shaft to a dial means and rotary switch means behind panel means 30 as shown in FIGURE 8, which is representative in structural arrangement for each pair of coarse and fine tuning knob means on the front of panel 30 as seen in the cockpit. Although each pair of fine and coarse tuning knob means for each pretuned station are mounted by concentric shaft means in FIGURE 1 to save space, each knob could be mounted as a separate unit by an individual shaft means to its respective dial and rotary switch means behind panel 30, if desired, as shown in the single line diagram of FIGURE 3. Each rotary switch means for each corresponding dial means is of a commercial 10 position contact type as illustrated in FIGURES 2 and 2A in which the rotor of the switch makes contact with all of the contacts except one, as will be more fully explained hereinafter.

The sensing circuit means of FIGURE 1 is performed by rotary switch means 37 and 38 on coarse tuning shaft 39 and fine tuning shaft 40, respectively, of receiver 21 of FIGURE 1. Switch means 37 and 38 are each of a commercial 10 contact type as illustrated in FIGURES 2 and 2B in which the rotor of the switch selectively makes contact with only each contact of the stator in sequence during rotation, for the purpose of sensing by the circuit of FIGURE 2 the open contact of the fine and coarse switch means of FIGURE 2A for a desired pretuned station as determined by pushing one of the three command push buttons 22a, 22b or 22c each of which closes a 20 contact switch of push buttons 27a, 27b or 27c for both the fine and coarse tuning circuits of a pretuned station as more clearly shown by the corresponding ganged switch means 27a, 27b and 27c and of the single line circuit diagram of FIGURE 3. For a detailed explanation of the 20 contacts for each switch of push buttons 27a, 27b and 27c, reference is made to FIGURES 2 and 3, which show that the 10 contacts of course tuning switch means 27aa and the 10 contacts of fine tuning switch 27a' which are mechanically linked together as one mechanical switch means 27a of FIGURES 1 and 3 for push button designated as 27a for one pretuned ground station for clarity. Likewise, the 10 contacts of coarse tuning switch means 27bb and the 10 contacts of fine tuning switch means 27b' of FIGURE 2 are mechanically linked together as one mechanical switch means 27b of FIGURES 1 and 3 for push button designated as 27b for a second pretuned ground station. Also, the 10 contacts of coarse tuning switch means 27cc and the 10 contacts of fine tuning switch means 27c' of FIGURE 2 are mechanically linked together as one mechanical switch means 27c of FIGURES 1, 2 and 3 for push button designated as 27c for a third pretuned ground station.

The rotor of 10 contact switch means 37 is fixedly secured by screw or spline means, as desired, to coarse tuning shaft 39. During a sensing operation for a pretuned station shaft 39 is actuated by solenoid means 41 through 10 position sprocket means 43 on shaft 39.

Likewise, the rotor of 10 contact switch means 38 for fine tuning is fixedly secured to shaft 40 and during a sensing operation for a pretuned station is actuated by solenoid means 42 through 10 position ratchet means 44 on shaft 40.

Rotary switch means 37 is connected by a 10 wire cable 45 to the coarse tuning side of the circuit of FIGURE 2, and rotary switch means 38 is connected by a 10 wire cable 46 to the fine tuning side of the circuit of FIGURES 1, 2 and 3, as shown.

Solenoid means 41 has a plunger terminating in a hook means 48 which integrally carries arm means 49 for contact with micro-switch 51 and arm means 78 for operating switch means 77, which is also actuated by arm means 49. Hook means 48 is biased in position by spring means 50 and 47 to engage sprocket means 43 without override of the tooth means of sprocket means 43, during the reciprocating movements of hook means 48, for a sensing operation to position coarse tuning shaft 39 to a preselected position of a selected dial means having its corresponding rotary switch circuit connection open by one of the push buttons 27a, 27b or 27c, for a desired ground station signal, as shown in the circuit of FIGURES 1, 2 and 3.

Solenoid means 42 has a plunger terminating in a hook means 53 which integrally carries arm means 54 and 54a for contact with micro-switches 55 and 55a for operating switch means 38. Hook means 53 is biased in position by spring means 52 and 56 to engage sprocket means 44 without override of the tooth means of sprocket means 44, during the reciprocating movements of hook means 53, for a sensing operating to position fine tuning shaft 40 to a preselected position of a selected dial means having its corresponding rotary switch circuit connection open by one of the push buttons 27a, 27b or 27c, for a desired ground station signal, as shown in the circuit of FIGURES 1, 2 and 3.

Solenoid means 41 and 42 are energized by a common electrical energy source as desired and both solenoid means operate in response to a selective push button command for a desired pretuned ground station through either of the command push buttons 22a, 22b, or 22c which actuate by common mechanical linkage means the switch means of each push button means 27a, 27b and 27c, respectively, as more clearly shown in the circuit of FIGURES 1, 2 and 3 considered together.

In FIGURES 1 and 3, coarse tuning knob means 31 is connected by rigid shaft means to dial means 31a and rotary switch means 31b; coarse tuning knob means 33 is rigidly connected by shaft means to dial means 33a and rotary switch means 33b; and coarse tuning knob means 35 is rigidly connected by shaft means to dial means 35a and rotary switch means 35b for the coarse tuning means of the circuit of FIGURE 2.

Likewise, in FIGURES 1 and 3, fine tuning knob means 32 is connected by rigid shaft means, as desired, to dial means 32a and rotary switch means 32b; fine tuning knob means 34 is connected by rigid shaft means to dial means 34a and rotary switch means 34b; and fine tuning knob 36 is connected by rigid shaft means to dial means 36a and rotary switch means 36b for the fine tuning portion of the circuit of FIGURE 2.

Coarse tuning dial means 31a, 33a and 35a of FIGURE 3 may be graduated in 10 one megacycle steps covering a frequency range of from 108 megacycles through 117.0 range.

Fine tuning dial means 32a, 34a and 36a of FIGURE 3 are graduated in ten 0.1 megacycle steps, that is, from the range of 0.0 megacycle to 0.9 megacycle.

By using the above combination of coarse and fine tuning a choice of 100 tuning positions or stations from 108.0 through 117.9 megacycles may be obtained for navigational purposes. By presetting each pair of coarse and fine tuning knobs in FIGURE 1, any one of the indicated three preselected ground stations may be rapidly tuned in by merely pushing one of the three command push buttons 22a, 22b and 22c, which operate push button means 27a, 27b, or 27c push button control means 28a, 28b and 28c, respectively, by a common mechanical linkage means 29 as shown in FIGURES 5 and 5A.

The coarse tuning and fine tuning circuit portions of FIGURE 2 are identical, symmetrical and operate in use and function similarly. The two tuning circuit portions are connected in parallel to a common electrical energy source (not shown) by leads 58 and 59, respectively, of FIGURE 2.

Coarse tuning sensing switch 37 of FIGURES 1 and 2 is connected by a 10 wire cable means 45 in parallel to coarse pretuning station switch means 31b, 33b and 35b and by the push button switch means 27aa, 25bb and 27cc, respectively, of push button means 27a, 27b and 27c.

Fine tuning sensing switch means 38 is connected by 10 wire cable means 46 in parallel to fine pretuning station switch means 32b, 34b and 36b by the push button switch means 27a', 27b' and 27c' of common push button means 27a, 27b and 27c, respectively, in FIGURES 1 and 2.

The sensing switch means 37 of the coarse tuning circuit portion is connected by its rotor means at all times by lead means 60 to solenoid means 41 which is connected in series to micro-switch means 77 by lead means 79 to ground 63 and in parallel to micro-switch means 51 by leads 61 and 76. Solenoid means 41 is connected to common ground means 63 for the electrical energy source by lead means 62 as shown in FIGURES 1 and 2.

Sensing switch means 38 of the fine tuning circuit portion of FIGURE 2 is connected by its rotor means at all times by lead means 64 to solenoid means 42 which is connected in series to micro-switch means 55 by lead means 66 and in parallel to micro-switch 55a by leads 65 and 65a. Solenoid means 42 is connected to common ground means 67 by lead means 66a, as shown in FIGURES 1 and 2.

Thus, it is seen that the coarse tuning circuit portion and the fine tuning circuit portion of FIGURE 2 are connected in parallel with the common electrical energy source (not shown) by leads means 58 and 59 and in parallel by lead means 62 and 66 to ground means 63 and 67 of the common ground means of the electrical energy source (not shown) in FIGURES 1 and 2.

FIGURES 5 and 5A disclose a partial view in cross-section of the structural arrangement of the mechanical linkage actuating means for operating the mechanical selector means 28 of course selector 17 and electrical push button means 27 of crystal controlled radio receiver 21 of FIGURE 1. The command or mechanical linkage for control means 27 as illustrated in FIGURES 1, 5 and 5A for three selected pretuned radio stations consists of push button 22a biased by spring means 29f terminating in a rigid cross-bar means 29 which actuates in unison mechanical push button 28a and 20 contact electrical push button 27a by rigid pin means 29' and 29c, respectively. The switch means of electrical push button means 27 contains 10 contacts of switch means 27aa and 10 contacts of switch means 27a', for the coarse and fine tuning of a radio station, respectively, as shown in FIGURES 2 and 3. Push button 22b is spring biased by spring 29g as shown and terminates in a cross-bar means 29a and actuates by pin means 29d, push button means 27b and by similar pin means push button means 28b. Likewise, push button 22c is biased by spring 29h as shown and terminates in rigid cross-bar means 29b which actuates by rigid pin means 29e push button 27c and also push button 28c by similar pin means.

FIGURE 8 consists of structure which applies to each set of coarse and fine tuning knobs as seen on the right hand side of panel 30 in the cockpit of the aircraft. For purposes of clarity, FIGURE 8, will only be described for knobs 31 and 32 and their corresponding tuning dials 31a and 32a with rotary switch counterparts 31b and 32b, respectively. The wiring to switch means 31b and 32b has been purposely omitted in FIGURE 2 for sake of clarity. The rotor means A of switch means 31b is secured to tuning dial means 31a by screw means. Rotor means A and dial means 31a are fixedly secured to hollow shaft means B by screw means, spline means or other desired means to knob 31. The stator means C containing the 10 contact positions of switch means 31b is stationarily secured by screw or bolt means E to panel 30 by bracket means D. Likewise, rotor means F of switch means 32b is secured to tuning dial means 32a by screw means. Rotor means F and dial means 32a are fixedly secured to shaft G by spline or other desired means which is also so fixedly attached to tuning knob means 32. Friction washer means H is carried on shaft means G between tuning knobs 32 and 31. Stator i of the 10 position contact stationary portion of switch means 32b is secured by bracket means j to panel 30 by screw means E. Shaft G is secured in position by nut and washer means k and l, respectively, as shown in FIGURE 8. Light means 30a may have any desired electrical energy source and illuminates tuning dials 31a and 32b through aperture 30b containing a marking pointer 30e on panel 30 as shown in FIGURE 1 for convenience of the aircraft pilot. Light means 30a is secured by bracket means 30c and screw means 30d to panel 30 of the aircraft as shown in FIGURE 8.

FIGURE 9 shows the sprocket ratchet and sensing switch structure in association with front panel 21b of receiver 21 for both tuning shaft means 38 and 39 of crystal tuned receiver 21 of FIGURE 1. For clarity, FIGURE 9 will only be described for tuning shaft 39, as the operation of tuning shaft 40 is identical to that of shaft 39. Sensing switch means 37 is mounted on tuning shaft 39 as shown. The 10 position contact stator means 37b is fixedly secured by bracket means 37c and screw means 37d to panel 21b of receiver 21 as shown. Rotor means 37a is fixedly secured by screw means 37e to tuning shaft 39. Ratchet sprocket 43 is fixedly secured to shaft means 39 by screw means 43a. Ratchet means 43 is selectively actuated by solenoid means 41 of FIGURE 1 and energized by the circuit of FIGURE 2 until sensing switch means 37 makes selective juxtaposition with an open contact in either of switch means 31b, 33b or 35b of FIGURE 2 as determined by switch means 27aa, 27bb and 27cc or one-half of push button means 27a, 27b or 27c of FIGURES 1 and 2 taken together.

The wiring to switch means 31b, 32b and 37 in FIGURES 8 and 9 has been omitted for clarity.

*Operation of sensing circuits*

To describe the operation of the sensing circuits, exemplary sequences will be defined for the coarse tuning circuit only for clarity, since the fine tuning circuit operates in identical manner. Assume that switch 31 has been preset to illustrated position or contact 7, and further, that switch 37 is in position or contact 7. When push button 22a is depressed, the resultant closing of switch means 27aa does not cause any stepping action, because both switch means 31 and 51 are open. Thus, if it happens that switches 31 and 37 are aligned by corresponding contacts no action from the solenoid results as the circuit is open. For purposes of illustration, assume that switch means 31 has again been preset to contact 7, but that this time switch means 37 is in the contact position 9, when switch means 27aa is closed, current flows through switches 31, 27aa and 37 to and through solenoid means 41, through switch means 77 to ground 63. The current flow in solenoid 41 moves hook means 48 to the right and turns cogwheel 43 in a counter-clockwise direction. The first motion of hook means 48 to the right moves arm 49 away from the actuating pin of micro-switch 51. This allows switch means 51, which is a normally closed single-pole-single-throw switch, to close, connecting the electric power supply to solenoid 41 without dependence upon the circuit of switch means 31, 27aa and 37. Hook means 47 continues the stepping action until switch means 37 has rotated 36 degrees to position or contact 8, at which time, arm means 49 opens switch 77, allowing spring 52 to start moving hook 48 to the left. Switch means 77 is a single-pole-single-throw switch which closes when pushed on the left pin, remains closed until opened by pushing the right contacting pin, and remains open until closed by pushing the left pin. As hook means 48 nears its extreme leftward position, arm 49 opens switch 51, allowing the circuit of switch means 31, 27aa and 37 to resume control. Hook means 48 by action of solenoid means 41 then slides by a tooth of cogwheel 43, tension spring means 40 snaps it into position, and the same time, arm 78 closes switch 77. This ends on complete stepping action, that is, switch means 37 has been moved by solenoid means 41 from position or contact 9 to contact 8. A second complete step action moves switch means 37 to contact 7 where the solenoid means 41 is deenergized by open contact in switch means 31. Thus, it may be seen that the sensing circuit for the course tuning circuit of FIGURES 1, 2, and 3 causes switch means 37, through solenoid 41, to align itself to the tuning position or contact preset into switch means 31.

To operate the aircraft navigational system of the embodiment of FIGURES 1, 2, 3, 5, 5A, 8 and 9, the pilot pretunes or sets tuning knobs 31 and 32 to the frequency of one station, then sets the tuning of fine and coarse tuning knobs 33 and 34 to a second radio station, after which he finally pretunes fine and coarse tuning knobs 35 and 36 to a third radio station. Then conventional mechanical push buttons 28a, 28b and 28c are released and preset for three desired settings of azimuths of course selector 17 corresponding to the three radio stations of the three sets of above tuning knobs. Then the pilot may be selectively pushing either of command push buttons 22a, 22b or 22c obtain the desired azimuth course of flight or line of position from or to the corresponding station of the three ground stations preset in the three above pairs of dials. When either of command push buttons 22a, 22b or 22c are pushed down the corresponding switch means of push buttons 27a, 27b or 27c closes the fine and coarse tuning circuits of FIGURES 1 and 2, after which solenoid means 41 and 42 actuate tuning shafts 39 and 40 through ratchet means 43 and 44, respectively to operate, for example, sensing switch means 37 and 38 until the two desired open contacts on switch means 31b and 32b are in the sensing circuit, which then de-energizes or stops solenoid means 41 and 42 by breaking the energizing circuit of FIGURE 2 of solenoid means 41 and 42. If another station is quickly desired, another of the command push button means is depressed setting the circuit of FIGURE 2 to another pretuned ground radio station and flight course selection. Then the above circuit operation is repeated as desired between any of the above pretuned three radio stations and flight courses as desired during flight.

FIGURE 4 is a second type of aircraft navigational system or embodiment of the invention which may be applied to a flight control panel of an aircraft, consisting of the combination of a radio receiver means 21a, a converter 15, flight path deviation indicator 16, flight course selector 17 and multiple push button control means 28 and 70, all of commercial manufacture, including control shaft 18, shown in dotted lines of panel 30, of selector 17, which is connected by mechanical linkage 19 to a conventional mechanical push button flight selector 28 to new push button control assembly mean 22 of multiple control assembly means 23 for selector 17 and push button tuning means 70 of radio receiver means 21a. Radio receiver means 21a is of the continuous tuned type having only one tuning shaft 71. Control assembly means 23 consists of three push button assembly means 28, 22 and 70. Push buttons 28a, 28b and 28c may be released by pulling the push buttons forward for disengagement with flight path selector and depressed as flight path selector is set selectively to three flight paths desired, similar to a conventional mechanical push button control for a car radio. Mechanical push button tuning control means 70 consists of three push button control means 70a, 70b and 70c and operates identical to control means 28 for three preset radio control settings as desired. Tuning control means 70 is connected by a conventional linkage means 72 to tuning shaft 71 of radio receiver 21a. Command tuning linkage means 22 consists of three fixed tuning buttons 22a, 22b and 22c. Push button control means 28 is connected by linkage means 19 to control shaft flight selector 17 behind panel means 30. In use, command push button 22a simultaneously operates push buttons 28a and 70a by linkage means 29 as shown in FIGURES 5 and 5A. Similarly, command push buttons 22b and 22c operate the pair of push buttons 28b and 70b and also push buttons 28c and 70c, respectively. Only one of command push button means 22a, 22b and 22c may be operated at a time, that is, the buttons are mutually exclusive.

To operate the navigation system of the embodiment of FIGURE 4, three desired azimuths or course selections are set input push buttons 28a, 28b and 28c, likewise the broadcast frequencies of three desired ground radio stations are preset into push button means 70a, 70b and 70c as above described. Then during flight by pushing either of command push buttons 22a, 22b or 22c the desired flight course and ground radio station is instantaneously tuned in on receiver 21a, and flight path selector 17.

FIGURE 6 is illustrative of another aircraft navigation system or third embodiment of the invention which consists of converter means 73, cathode ray tube flight path indicator 74, continuous tuned radio receiver 21a controlled by conventional mechanical push button tuning means 70 as in FIGURE 4 by mechanical linkage means 72 connected to tuning shaft 71 of radio receiver 21a. For this system of aircraft navigation, converter means 73 is connected by electrical linkage means 73b to receiver 21a. The output signal of converter means 73 is energized by suitable cable means 73a to cathode ray tube flight course indicator means 74 graduated in course degrees, as understood by those skilled in the art. To operate this system of aircraft navigation, three frequencies of radio ground stations are preset into push buttons 70a, 70b and 70c as described in FIGURE 4. During flight either of push buttons 70a, 70b or 70c may be depressed selectively to instantly tune in one of the three aforementioned radio stations after which the line of position will be immediately indicated on CRT indicator 74.

FIGURE 7 illustrates another aircraft navigational system or fourth embodiment of the invention which consists of an automatic direction finding (ADF) navigation system including a continuously tuned radio receiver 24 with special antenna, automatic direction finding indicator 75 in combination with a mechanical push button assembly 70 connected to conventional mechanical linkage means 73 of tuning shaft 71. Receiver 21a is connected by electrical linkage means 74 to (ADF) meter indicator 75. The mechanical push button assembly 70 operates through preset push button means 70a, 70b and 70c for three selected ground radio stations identical to the operation of tuning means 70 of FIGURE 6. The push buttons 70a, 70b and 70c may be quickly preset to three radio ground stations before or during flight, as desired. By pushing one of push button means 70a, 70b or 70c, a desired radio station is instantaneously tuned in and the relative line of position is indicated on (ADF) meter 75 for navigation of the aeroplane.

It is to be understood, that while I have used for illustrative purposes only, three preset lines of position or three radio ground stations in each of the four embodiments of my invention, other stations may be added or subtracted to each navigational system by those skilled in the art within the purview and intent of this invention.

While there has been described what is at present considered to be the preferred embodiments of my invention, it will be obvious to those skilled in the art that various changes may be made therein without departing from the spirit and scope of the invention. Therefore, it is to be understood, that the scope of this invention is not to be restricted, except as covered by the following claims.

What is claimed is:

1. A radio signal receiving and directional indicating system for navigating aircraft comprising a radio receiver means, converter means operably interconnected to said receiver means; flight path indicator means and course selector means connected to and synchronized with said converter means, and multiple command tuning means for simultaneously tuning the radio receiver means in synchronism with the course selector means for contact with a selected visual omni-range station or a ground station of an instrument landing system for navigation of an aircraft during flight.

2. A radio signal receiving and directional indicating system for navigating aircraft during flight comprising a radio receiver means, converter means connected for receiving the signal output of the radio receiver means, course selector means interconnected and synchronized with said converter means, flight path deviation indicating means operably connected to said converter means, and unitary and multiple command tuning means for simultaneously tuning said radio receiver means and said course selector means to a selected ground signal station during flight of the aircraft.

3. A radio signal receiving and directional indicating system for navigating aircraft during flight comprising a converter, radio signal means including a flight path indicator means and flight course selector means, all juxtaposed to the pilot in the cockpit of the aircraft, a remotely positioned tunable radio receiver means in the aircraft having a signal output connected to said converter means, a multiple station tuning means for simultaneously tuning said radio receiver means and said course selector means to selectively receive the signal from a selected radio station for navigation of the aircraft.

4. A radio signal receiving and directional indicating system for navigating aircraft during flight comprising a flight path deviation indicator means, flight course selector means, a tunable radio receiver means having a received radio signal output means interconnected to said course selector means, a universal multiple station radio tuning means for simultaneously tuning said radio receiver means and adjusting said course selector means selectively and instantaneously to a desired radio signal from a transmitting station of a visual omni-range station or localizer signal of an instrument landing system during flight of the aircraft.

5. A radio signal receiving and directional indicating system for navigating aircraft during flight as in claim 4, wherein the tuning means includes a conventional mechanical push button tuning means for the receiver and a conventional mechanical push button tuner for the course selector, and mechanical linkage push button means to simultaneously actuate the two mechanical tuning means by one centrally disposed push button means corresponding to radio station and flight course selection by the system during flight.

6. A radio signal receiving and directional indicating system for navigating aircraft during flight as in claim 3, wherein the tuning means includes a conventional electrical tuning means for the receiver, a conventional mechanical control means for the course selector and reciprocating linkage command means to simultaneously actuate the respective push buttons of the two tuning means to simultaneously tune the radio receiver and course selector to a desired transmitting station.

7. A compact radio signal receiving and flight course directional indicating system for navigating aircraft during flight comprising a crystal tuned radio signal receiver means having coarse and fine tuning shafts, a radio signal converter means including a flight path deviation indicator means, and flight path selector means interconnected to the signal output means of said radio receiver means; and multiple station control means adapted to simultaneously and selectively tune in by one command mode of operation said radio receiver means and adjusting said flight path selector means to a desired distant signal output of a visual omni-range transmitting station or the selected transmitted localizer signal of an instrument landing system; said multiple tuning means including integrated conventional mechanical tuning means for the converter means and selective electrical 10 contact tuning means for the radio receiver means to appropriately follow and receive, identify, and display to a pilot of an aircraft the signal information transmitted by selected ground stations during flight.

8. A radio signal receiving and flight course directional indicating system for navigating aircraft during flight as in claim 7, wherein said selective electrical tuning means for the radio receiver means includes a plurality of rotary ten contact tuning switches selectively positioned and secured on the tuning shafts of the receiver; a saw tooth sprocket secured on the end of said tuning shafts and circuit means including electrical dual solenoid means for said shafts adapted to selectively rotate said tuning shafts to selectively open the desired circuit means to tune in a desired radio transmitting station in response to a single tuning command of the multiple station control means.

9. A radio signal receiving and flight course directional indiciating system for navigating aircraft during flight as in claim 8, wherein said tuning means comprises a plurality of rotary tuning dial and switch means which are pretuned and arranged in parallel circuit arrangement with each other in said circuit, said switches being energized by a desired common electrical energy means and connected in parallel and in series circuit for the coarse tuning and fine tuning arrangements to each of said solenoid actuator means connected in series circuit arrangement to a micro-switch which is grounded to the common circuit ground of the electrical energizing means of said circuit means to selectively and quickly tune the receiver from station to station during flight.

10. A compact radio signal receiving and course indicating system for navigating aircraft during flight comprising a crystal tuned radio signal receiver means having coarse and fine tuning shafts, a radio signal converter means, a flight path selector means interconnected to the signal output means of said radio receiver means; and multiple station tuning means adapted to simultaneously and selectively tune in by one command mode of push button operation said radio receiver means and adjusting said flight path selector means to a desired distant signal output of a visual omni-range transmitting station or the selected transmitted localizer signal of an instrument landing system; said multiple tuning including integrated conventional mechanical tuning means for the converter means and selective electrical 10 contact energized tuning circuit means for said radio receiver means to appropriately follow a desired azimuth course of flight, receive, identify, process data and display to a pilot of an aircraft the signal information transmitted by a plurality of selected ground stations during flight.

11. A compact signal receiving and course indicating system for navigating aircraft during flight as in claim 10, said tuning circuit means including a fine tuning circuit means and a coarse tuning circuit means and dual solenoid actuated means selectively actuated by said fine tuning circuit means and said coarse tuning circuit means, respectively.

12. A compact signal receiving and course indicating system for navigating airacraft during flight as in claim 11, wherein said fine tuning circuit means and said coarse tuning circuit means include selective sensing circuit means and sensing switch means for selectively operating said dual solenoid actuated means through said command tuning means to select a desired course of flight and ground radio station of a plurality of flight paths and pretuned radio stations.

13. A compact signal receiving and course indicating system for navigating aircraft during flight as in claim 12, wherein said solenoid means includes a limiting circuit comprising dual micro-switches actuated by the reciprocating movement of the hook and piston means of each solenoid means.

References Cited by the Examiner

UNITED STATES PATENTS 2,636,167    4/1953    Schuch _____ 343—112

OTHER REFERENCES

McGillivray, Wireless World, October, 1940, pp. 428,429.

CHESTER L. JUSTUS, *Primary Examiner.*

R. E. BERGER, *Assistant Examiner.*